(12) United States Patent
Maguire

(10) Patent No.: US 9,932,159 B2
(45) Date of Patent: Apr. 3, 2018

(54) CAP FOR CONTAINER

(71) Applicant: Michael Joseph Maguire, San Jose, CA (US)

(72) Inventor: Michael Joseph Maguire, San Jose, CA (US)

( * ) Notice: Subject to any disclaimer, the term of this patent is extended or adjusted under 35 U.S.C. 154(b) by 0 days.

(21) Appl. No.: 15/480,125

(22) Filed: Apr. 5, 2017

(65) Prior Publication Data

US 2017/0203896 A1     Jul. 20, 2017

Related U.S. Application Data

(63) Continuation of application No. 14/725,246, filed on May 29, 2015, now Pat. No. 9,643,762.

(30) Foreign Application Priority Data

Apr. 2, 2015 (TW) .............................. 104110838 A

(51) Int. Cl.
| | |
|---|---|
| *B65D 41/04* | (2006.01) |
| *B65D 55/16* | (2006.01) |
| *B65D 41/34* | (2006.01) |
| *B29C 45/00* | (2006.01) |
| *B29K 23/00* | (2006.01) |
| *B29L 31/56* | (2006.01) |

(52) U.S. Cl.
CPC .......... *B65D 55/16* (2013.01); *B29C 45/0017* (2013.01); *B65D 41/04* (2013.01); *B65D 41/3428* (2013.01); *B65D 41/3447* (2013.01); *B29K 2023/12* (2013.01); *B29L 2031/565* (2013.01)

(58) Field of Classification Search
CPC ............ B65D 41/0471; B65D 41/3447; B65D 41/3428; B65D 41/3433; B65D 55/16; B65D 41/04; B29C 45/0017; B29L 2031/565; B29K 2023/12
USPC ........................................ 215/252, 253, 306
See application file for complete search history.

(56) References Cited

U.S. PATENT DOCUMENTS

| | | | | |
|---|---|---|---|---|
| 3,812,991 | A * | 5/1974 | Wurl .................... | B65D 41/348 215/252 |
| 3,910,443 | A * | 10/1975 | Hadley ................ | B65D 41/348 215/252 |
| 6,474,491 | B1 * | 11/2002 | Benoit-Gonin .... | B65D 41/3428 215/252 |
| 2005/0045578 | A1 * | 3/2005 | Schwarz ............ | B65D 41/3428 215/252 |
| 2010/0258520 | A1 * | 10/2010 | Giraud .................... | B26D 3/11 215/252 |

(Continued)

*Primary Examiner* — James N Smalley
(74) *Attorney, Agent, or Firm* — Douglas L. Weller

(57) ABSTRACT

The present invention relates to a cap for a container. The cap comprises a main body having a top plate and a circular sidewall, wherein one periphery of the circular sidewall connects to the top plate forming a closed end, and the other periphery of the circular sidewall at the opposite side of the closed end forms an opened end; and a ring member located at the opened end of the main body, separated from the main body by a first incision line, and connected to the main body by a plurality of connecting portions, wherein a plurality of second incision lines locate on the main body or the ring member and locate at one side of the plurality of connecting portions. The cap provided by the present invention will, while in its open and/or closed state, continue to be connected to its container.

16 Claims, 6 Drawing Sheets

(56) References Cited

U.S. PATENT DOCUMENTS

2011/0114593 A1\* 5/2011 Ishii .................... B65D 41/325
                                                    215/253
2015/0251827 A1\* 9/2015 Campbell ............. B65D 55/16
                                                    215/252

\* cited by examiner

CAP FOR CONTAINER

CROSS REFERENCE TO RELATED APPLICATION

The current invention is a continuation of, and claims priority to, U.S. Ser. No. 14/725,246 filed on May 29, 2015, now U.S. Pat. No. 9,643,762. This application also claims the benefits of the Taiwan Patent Application Serial Number 104110838, filed on Apr. 2, 2015, the subject matter of which is incorporated herein by reference.

BACKGROUND OF THE INVENTION

1. Field of the Invention

The present invention relates to a cap and, more particularly, to a cap for a container.

2. Description of Related Art

In general, the cap of any conventional container is always completely separated from its container once the container is opened. For that reason, it is easy for the separated cap to be dropped, accidentally disposed of, and/or misplaced/lost. Moreover, the separated cap when dropped can easily become soiled by coming in to contact with the ground or other uncontrolled surfaces resulting in the cap becoming no longer reusable. Furthermore, the discarded or misplaced/lost separated caps are able to and will pollute the environment and cause additional environmental problems. Therefore, in order to solve these problems, the industry has developed a few caps that will remain connected to their containers while their containers are in an open state. These few caps are thereby prevented from being separated from their containers, dropped, accidentally discarded, misplaced/lost, soiled by contact with the ground or other uncontrolled surfaces or able to pollute the environment or cause additional environmental problems.

Nonetheless, the currently existing caps with the above-mentioned functions usually require much more complex designs. Specifically, these designs normally involve the need of more than one component or structure; for example, besides a main body structure for the caps, the designs also necessitate a complicated connecting structure to connect the caps to their containers once the containers have been opened. Furthermore, the designs also necessitate a barrier structure to prevent the caps, while in an open state, from interfering with the opening of their containers and also insuring that the caps remain in an open state when so desired by the user. Additionally, the complicated connecting structures necessitate some difficult physical manipulation by the user to return the caps to a closed sealed state. In order to manufacture caps with these structures, the materials and the numbers of components used are increased to beyond the industry and market standards. The manufacturing process of these caps also requires several levels of production utilizing multiple pieces of manufacturing equipment (machines) to create the complicated connecting structures. Accordingly, not only the cost of material increases but also the overhead costs of manufacturing equipment and man hours involved are increased as well. The cost and inefficiency of the manufacturing process of these caps is quite high and above the market and industry requirements.

Therefore, there is a need to provide a cap with the above-mentioned functions by using a simpler design and structure with the use of less material, fewer pieces of manufacturing equipment and fewer man hours to create a much more environmentally friendly, simply manufactured, high production efficient, and much lower cost cap.

SUMMARY OF THE INVENTION

The object of the present invention is to provide a cap for a container. More particularly, compared to conventional caps, the cap provided by the present invention, through its much simpler design and structure, will allow the cap in an open state relative to its container to still be maintained in a connected state to the container. In addition, the cap of the present invention will also remain in an open state, when so desired, without any physical manipulation from the user. The cap will not interfere with the opening of the container while in an open state and the free movement of the cap will be limited preventing the cap, while in the open state, from interfering with the user. The cap of the present invention can quite easily be returned to the closed sealed state and will also prevent the cap from being dropped, lost, misplaced, accidentally discarded, soiled by contact with uncontrolled surfaces or allowed to pollute, damage or adversely affect the environment.

To achieve the object, the present invention provides a cap for a container, which includes a main body having a top plate and a circular sidewall, wherein the two opposite sides of the circular sidewall circularly connect to each other, one periphery of the circular sidewall connects to one surface of the top plate forming a closed end, and the other periphery of the circular sidewall at the opposite side of the closed end forms an opened end; and a ring member, which is located at the opened end of the main body, separated from the main body by a first incision line in between the opened end of the main body and the ring member, and connected to the main body by a plurality of connecting portions, wherein the two ends of the first incision line are separated by the plurality of connecting portions; wherein a plurality of connecting pins locate along the first incision line, the plurality of connecting pins connect the main body and the ring member at the two sides of the first incision line, a plurality of second incision lines locate on the main body or the ring member and locate at one side of the plurality of connecting portions, the plurality of second incision lines do not overlap with the first incision line, and the two ends of the plurality of second incision lines and itself are not connected.

In the present invention, the plurality of connecting portions can be formed in between the first incision line and the plurality of second incision lines. The plurality of connecting portions can also be formed among the plurality of second incision lines. The shape of the plurality of connecting portions is not particularly limited. The shape of the plurality of the connecting portions is depended on the shapes of the first incision line and the plurality of second incision lines located at the sides of the plurality of connecting portions. The quantity of the plurality of connecting portions is not particularly limited. The spacing between each of the plurality of connecting portions is not particularly limited as well, except that each of the plurality of connecting portions is separated by parts of the plurality of second incision lines.

In the present invention, the quantity of the plurality of second incision lines is not particularly limited. The spacing between each of the plurality of second incision lines is not particularly limited as well. In addition to the disposition of the plurality of second incision lines to the main body or the ring member, the plurality of second incision lines can also extend from the main body to the ring member or extend from the ring member to the main body. Although the plurality of second incision lines do not overlap with the first incision line; however, the plurality of second incision lines can be connected to parts of the first incision line. Furthermore, parts of the plurality of second incision lines can be parallel to the first incision line.

In the present invention, the first incision line and the plurality of second incision lines are not particularly limited. However, the first incision line and the plurality of second incision lines can individually be preferred to be straight lines, curved lines, polylines, arc lines, or the combinations thereof. The plurality of second incision lines can also be more preferably be L-shaped lines, S-shaped lines, Z-shaped lines, or the combinations thereof, wherein the corners of the plurality of second incision lines are not particularly limited. The corners of the plurality of second incision lines are preferred to be curved corners, chamfered corners, sharp corners, or the combinations thereof. The first incision line and the plurality of second incision lines can individually be the same type of lines or different types of lines.

In the present invention, the first incision line and the plurality of second incision lines surround parts of the circular sidewall or the ring member, but do not fully surround the circular sidewall or the ring member. The lengths of the first incision line and the plurality of second incision lines surrounded the circular sidewall or the ring member are not particularly limited. Preferably, the length of the first incision line surrounded the circular sidewall or the ring member is longer than the lengths of each of the plurality of second incision lines surrounded the circular sidewall or the ring member. In particular, it is preferred that the first incision line surrounds larger than ¾ of the circular sidewall or the ring member. It is more preferable that the first incision line surrounds larger than ⅘ of the circular sidewall or the ring member. On the other hand, it is preferred that the plurality of second incision lines surround less than ¾ of the circular sidewall or the ring member, more preferably less than ½ of the circular sidewall or the ring member, and most preferably less than ¼ of the circular sidewall or the ring member.

In the present invention, the cap provided can be used together with any conventional containers without any particular limitation as long as the cap and the container can be assembled together. The shape of the cap is not particularly limited; however, the inner side of the cap is preferred to be circular. The shape of the container is also not particularly limited as well; however, the opening of the container is preferred to be a circular opening. In the present invention, the container is preferred to be a round bottle or a round can.

In the present invention, the main body of the cap provided is adapted to cooperate with the opening of a container to control the opening and closing of the opening of the container. More specifically, the inner side of the main body has thread. Through a complementary thread structure at the outer side of the opening of the container, the main body can be screwed opened and screwed closed on the opening of the container by rotation.

In the present invention, when the main body of the cap provided is screwed closed on the opening of the container, the closed end of the main body will abut against the opening of the container. Meanwhile, the opened end of the main body will face toward the opening of the container and cover and fit on the opening of the container. Consequently, the opening of the container is in a closed state with the container remaining sealed.

In the present invention, the outer side of the main body of the cap provided can have a knurled portion. When the container is to be opened, the knurled portion can facilitate applying a force to rotate and separate the main body and the ring member.

In the present invention, depending on the actual needs, the first incision line disposed between the main body and the ring member of the cap provided can have a plurality of connecting pins to connect the main body and the ring member. The shape, size, quantity, and spacing of the plurality of connecting pins are not particularly limited. When the size and quantity of the plurality of connecting pins of the first incision line are smaller and the spacing of the plurality of connecting pins is larger, the force needed to break the plurality of connecting pins is smaller. Subsequently, the separation of the main body and the ring member will be easier. On the contrary, when the size and quantity of the plurality of connecting pins of the first incision line are larger and the spacing of the plurality of connecting pins is smaller, the force needed to break the plurality of connecting pins is larger. Subsequently, the separation of the main body and the ring member will be more difficult. In the cap provided by the present invention, the plurality of second incision lines do not possess a plurality of connecting pins.

In the present invention, when the main body of the cap provided by the present invention has been screwed opened from the opening of the container, the plurality of connecting portions will connect the main body and the ring member together. Since the ring member is fitted below a bulge portion of the opening of the container; thus, the ring member will not detach from the opening of the container. As a result, the connection between the main body separated from the opening of the container with the ring member will allow the main body to still remain in a connected state with the container. Moreover, the plurality of connecting portions can also allow the main body to remain in an opened state. The plurality of connecting portions will prevent the main body from interfering the opening of the container. The plurality of connecting portions will also decrease the free movement of the main body. As a result, when emptying the contents from the container, the plurality of connecting portions can prevent the main body from touching other objects due to its free movement. The residual contents at the inner side of the main body will also not be able to spill out easily. And since the ring member fitted on the opening of the container can freely rotate; hence, the plurality of connecting portions will not be pulled off easily.

In the present invention, the cap provided can be made by using any materials known in the art without any particular limitation. In particular, the material for the cap is preferred to be plastic, such as polyester, PET, PE, HDPE, PP, PS, PMMA or PC. The cap can be manufactured by any processes known in the art without any particular limitation. The manufacturing process of the cap is preferably by injection molding. The first incision line and the plurality of second incision lines can be formed by any known methods without any particular limitation. The first incision line and the plurality of second incision lines are preferably formed by rotary cutting. The incisions are preferably done by conventional cutting tools or laser cutting.

Overall, in the present invention, by using the above-mentioned simple design and structure, a cap placed in an open state relative to its container will continue to be connected to its container. The cap of the present invention will also remain in an open state, when so desired, without any physical manipulation from the user. The cap will not interfere with the opening of the container while in an open state and the free movement of the cap will be limited preventing the cap, in the open state, from interfering with the user. The cap of the present invention can quite easily be returned to the closed state and will also prevent the cap from being dropped, lost, misplaced, accidentally discarded, soiled by contact with uncontrolled surfaces or allowed to pollute, damage or adversely affect the environment.

Other objects, advantages, and novel features of the invention will become more apparent from the following detailed description when taken in conjunction with the accompanying drawings.

DETAILED DESCRIPTION OF THE PREFERRED EMBODIMENT

Example 1

Figure 1:
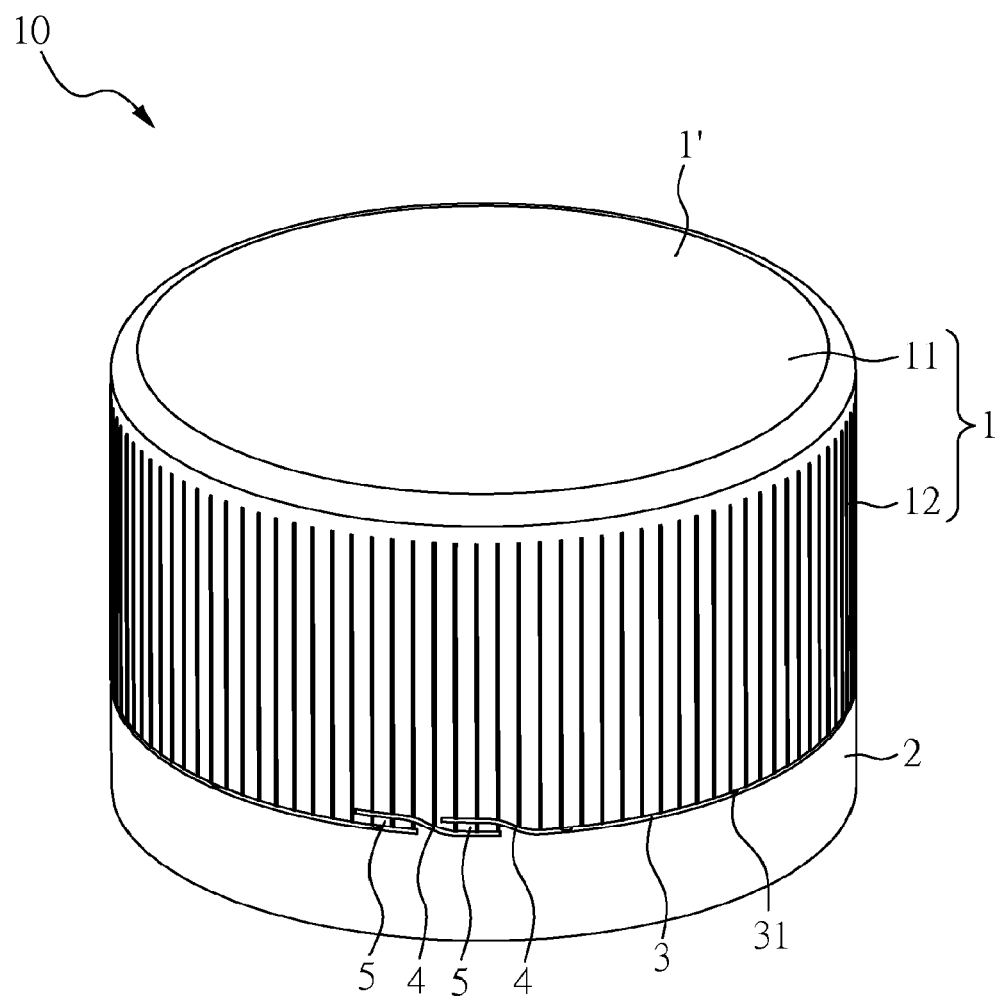
FIG. 1 is a three-dimensional schematic diagram showing an embodiment of the cap for a container of the present invention.

FIG. 1 is a three-dimensional schematic diagram showing an embodiment of the cap for a container of the present invention. As FIG. 1 shows, the cap 10 of the present example includes a main body 1 having a top plate 11 and a circular sidewall 12. The two opposite sides of the circular sidewall 12 circularly connect to each other. One periphery of the circular sidewall 12 connects to one surface of the top plate 11 forming a closed end 1'. The other periphery of the circular sidewall 12 at the opposite side of the closed end 1' forms an opened end 1" (shown in FIG. 3). The cap 10 of the present example also contains a ring member 2, which is located at the opened end 1" of the main body 1. The ring member 2 is separated from the main body 1 by a first incision line 3 located in between the opened end 1" of the main body 1 and the ring member 2. The first incision line 3 possesses a plurality of connecting pins 31. The plurality of connecting pins 31 located along the first incision line 3 connect the main body 1 and the ring member 2 at the two sides of the first incision line 3. The two ends of the first incision line 3 are separated by a plurality of connecting portions 5. The plurality of connecting portions 5 connect the main body 1 and the ring member 2 together. Located at one side of the plurality of connecting portions 5 is a plurality of second incision lines 4. The plurality of second incision lines 4 are also located either on the main body 1 or the ring member 2. The two ends of the plurality of second incision lines 4 and itself are not connected. The plurality of second incision lines 4 do not overlap with the first incision line 3.

Figure 2A:
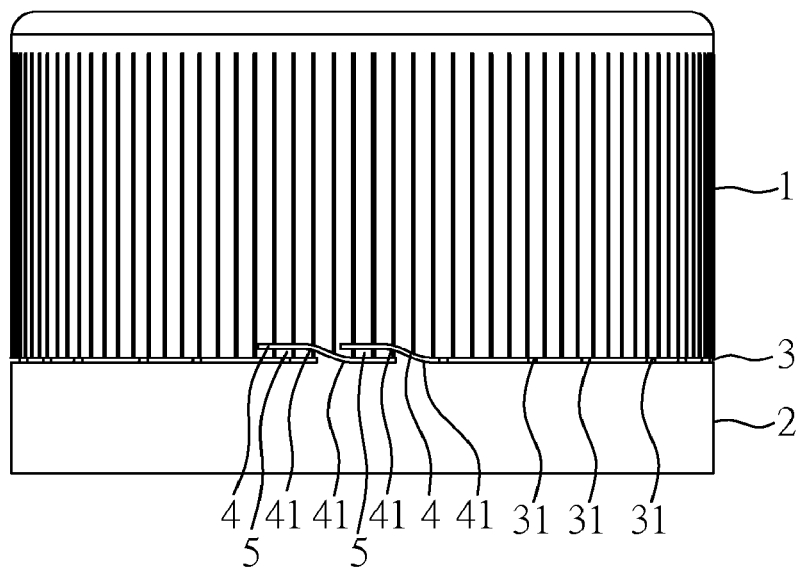
FIG. 2A-2G are schematic diagrams showing the different embodiments of the cap for a container of the present invention.

As FIG. 2A shows, in the present example, the plurality of connecting portions 5 are formed in between the first incision line 3 and the plurality of second incision lines 4. In the present invention, the shape of the plurality of connecting portions 5 is not particularly limited. The shape of the plurality of the connecting portions 5 is depended on the shapes of the first incision line 3 and the plurality of second incision lines 4 located at the sides of the plurality of connecting portions 5. In the present example, the shape of the plurality of connecting portions 5 is cuboid (shown in FIG. 3). In the present invention, the quantity of the plurality of connecting portions 5 is not particularly limited. However, in the present example, the quantity of the plurality of connecting portions 5 is 2. In the present invention, the spacing between each of the plurality of connecting portions 5 is not particularly limited as well. However, in the present example, each of the plurality of connecting portions 5 is separated by parts of the plurality of second incision lines 4.

In the present invention, the quantity of the plurality of second incision lines 4 is not particularly limited. However, in the present example, the quantity of the plurality of second incision lines 4 is 2. As FIG. 2A shows, only the main body 1 possesses the plurality of second incision lines 4. One of the two second incision lines 4 is connected to parts of the first incision line 3. Furthermore, parts of the plurality of second incision lines 4 are parallel to the first incision line 3.

In the present invention, the first incision line 3 and the plurality of second incision lines 4 are not particularly limited. The first incision line 3 and the plurality of second incision lines 4 can individually be preferred to be straight lines, curved lines, polylines, arc lines, or the combinations thereof. In the present example, the first incision line 3 is a straight line. The plurality of second incision lines 4 can also be more preferably be L-shaped lines, S-shaped lines, Z-shaped lines, or the combinations thereof. In the present example, the plurality of second incision lines 4 are Z-shaped lines. In the present invention, the corners 41 of the plurality of second incision lines 4 are not particularly limited. The corners 41 of the plurality of second incision lines 4 are preferred to be curved corners, chamfered corners, sharp corners, or the combinations thereof. In the present example, the corners 41 of the plurality of second incision lines 4 are curved corners.

In the present invention, the first incision line 3 and the plurality of second incision lines 4 surround parts of the circular sidewall 12 or the ring member 2, but do not fully surround the circular sidewall 12 or the ring member 2. The lengths of the first incision line 3 and the plurality of second incision lines 4 surrounded the circular sidewall 12 or the ring member 2 are not particularly limited. In the present example, the length of the first incision line 3 surrounded the circular sidewall 12 or the ring member 2 is longer than the lengths of each of the plurality of second incision lines 4 surrounded the circular sidewall 12 or the ring member 2. In the present invention, it is preferred that the first incision line 3 surrounds larger than ¾ of the circular sidewall 12 or the ring member 2 and more preferably larger than ⅘ of the circular sidewall 12 or the ring member 1. In the present example, the first incision line 3 surrounds larger than ⅘ of the circular sidewall 12 or the ring member 2. In the present invention, it is preferred that the plurality of second incision lines 4 surround less than ¾ of the circular sidewall 12 or the ring member 2, more preferably less than ½ of the circular sidewall 12 or the ring member 2, and most preferably less than ¼ of the circular sidewall 12 or the ring member 2. In the present example, the plurality of second incision lines 4 surround less than ⅕ of the circular sidewall 12.

Example 2

Figure 2B:
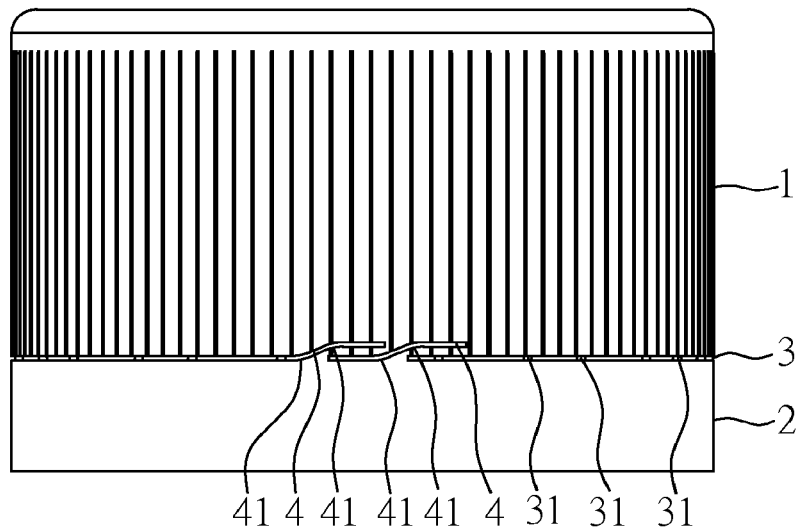

FIG. 2B is a schematic diagram showing another embodiment of the cap for a container of the present invention. The cap of the present example and the cap of example 1 are the same except that the plurality of second incision lines 4 and the plurality of second incision lines 4 shown in FIG. 2A are opposite to each other. Nevertheless, the opening directions of the cap and that of the cap shown in FIG. 2A are still the same (both are in the anti-clockwise direction; that is rotation in the right direction in FIG. 2A or FIG. 2B).

Example 3

Figure 2C:
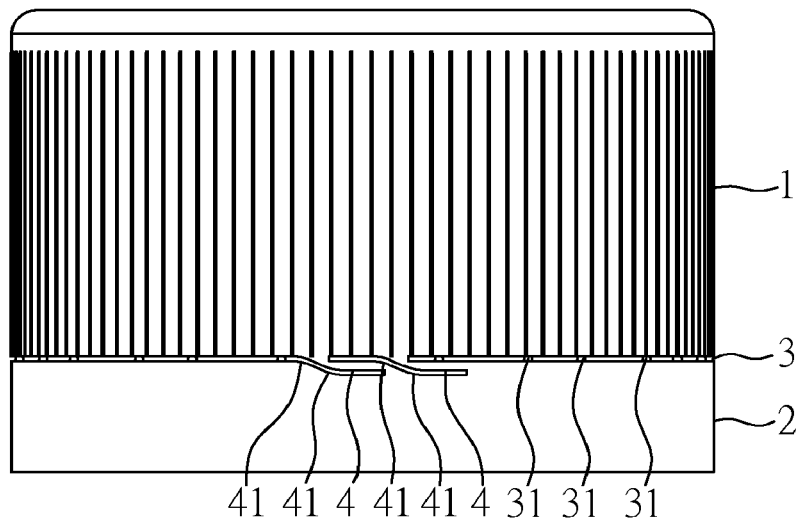

FIG. 2C is a schematic diagram showing another embodiment of the cap for a container of the present invention. The cap of the present example and the cap of example 1 are the same except that only the ring member 2 possesses the plurality of second incision lines 4 and the plurality of second incision lines 4 surround less than ⅕ of the ring member 2.

Example 4

Figure 2D:
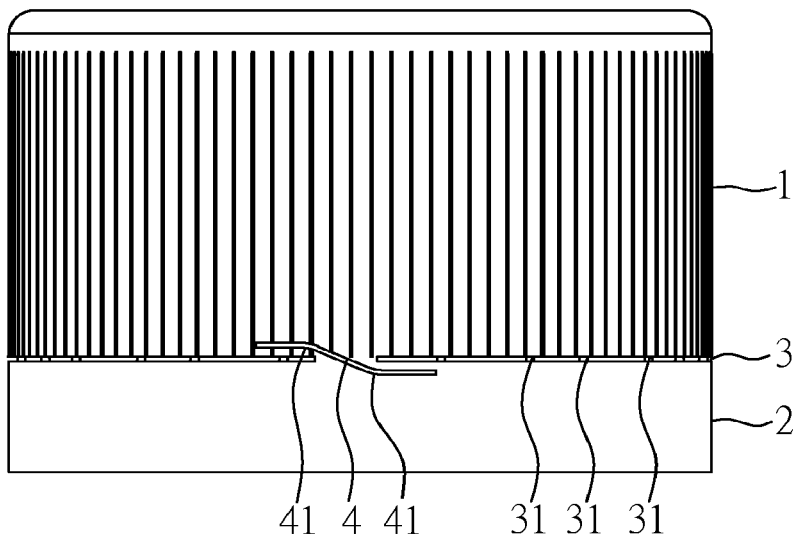

FIG. 2D is a schematic diagram showing another embodiment of the cap for a container of the present invention. The cap of the present example and the cap of example 1 are the same except that the quantity of the plurality of second incision lines 4 is 1, the second incision line 4 extends from the main body 1 to the ring member 2 or from the ring member 2 to the main body 1, the second incision line 4 and the first incision line 3 are not connected, the corners 41 of the second incision line 4 (Z-shaped line) are sharp corners, and the second incision line 4 surrounds less than ⅕ of the circular sidewall 12 and less than ⅕ of the ring member 2.

Example 5

Figure 2E:
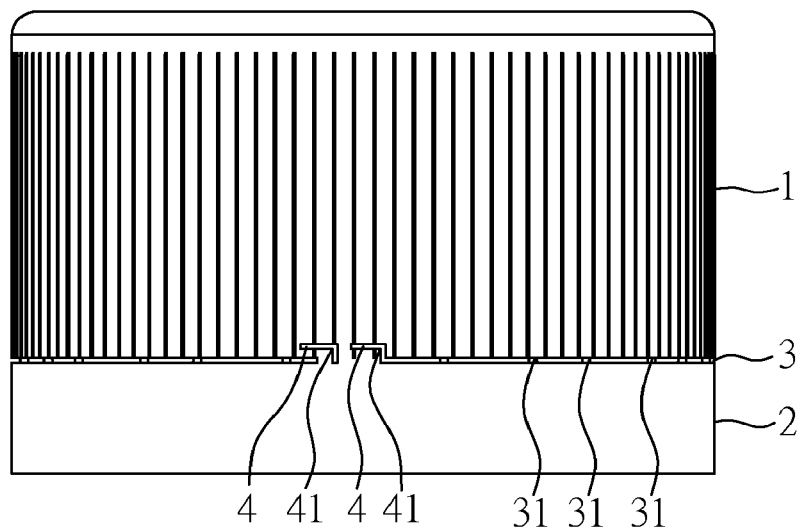

FIG. 2E is a schematic diagram showing another embodiment of the cap for a container of the present invention. The cap of the present example and the cap of example 1 are the same except that the plurality of second incision lines 4 are L-shaped lines and the corners 41 of these L-shaped lines are sharp corners.

Example 6

Figure 2F:
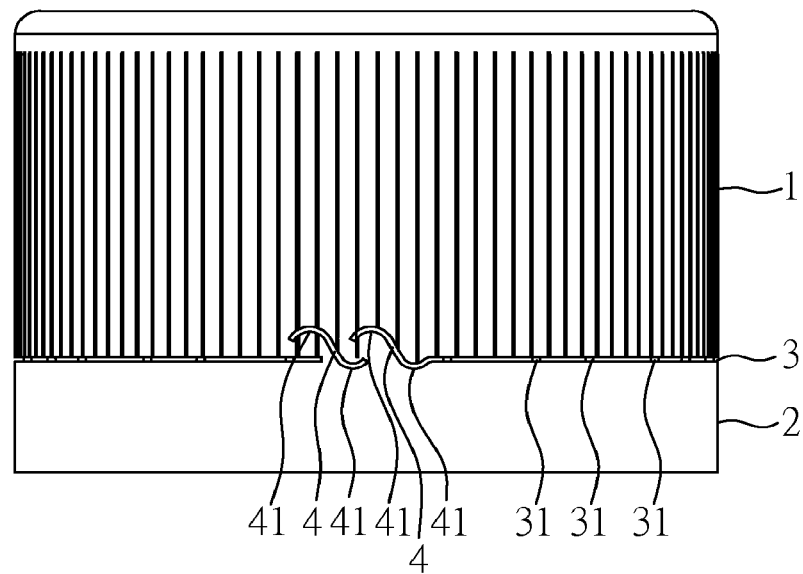

FIG. 2F is a schematic diagram showing another embodiment of the cap for a container of the present invention. The cap of the present example and the cap of example 1 are the same except that the plurality of second incision lines 4 and the first incision line 3 are not parallel to each other and the plurality of second incision lines 4 are S-shaped lines.

Example 7

Figure 2G:
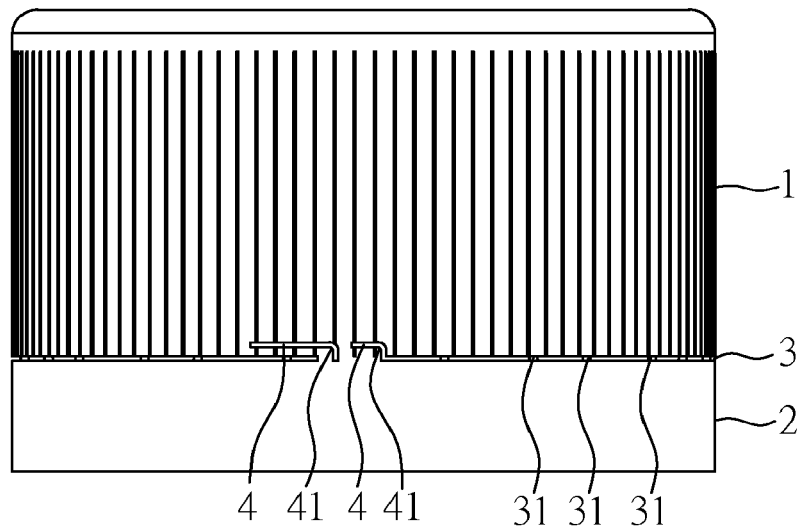

FIG. 2G is a schematic diagram showing another embodiment of the cap for a container of the present invention. The cap of the present example and the cap of example 4 are the same except that the corners 41 of the plurality of second incision lines 4 (L-shaped lines) are curved corners and one of the second incision lines 4 surrounds less than ½ of the circular sidewall 12.

Figure 3:
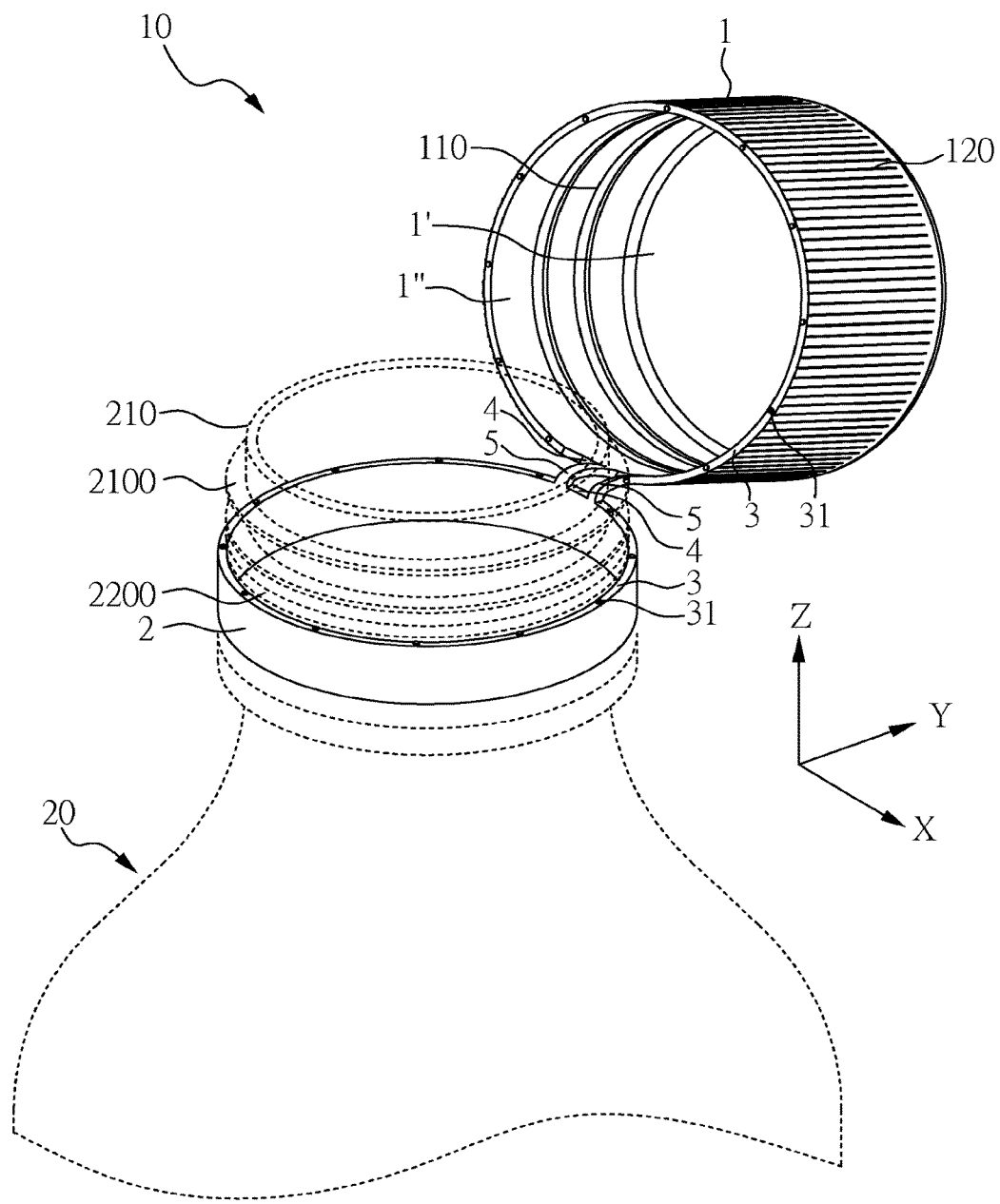
FIG. 3 is a three-dimensional schematic diagram showing an embodiment of the cap for a container of the present invention being separated from a container.

FIG. 3 is a three-dimensional schematic diagram showing an embodiment of the cap for a container of the present invention being separated from a container, wherein the cap shown can be any one of the caps of any one of the above-mentioned examples. Hereinafter, the practical application of the cap provided by the present invention will be further described in detail using the cap of example 1.

In the present invention, the cap 10 provided can be used together with any conventional containers without any particular limitation as long as the cap 10 and the container 20 can be assembled together. In the present invention, the shape of the cap 10 is not particularly limited. As shown in FIG. 3, the inner side of the cap is circular. In the present invention, the shape of the container 20 is also not particularly limited as well. As shown in FIG. 3, the opening 210 of the container is a circular opening. In the present invention, the container 20 is preferred to be a round bottle or a round can. As shown in FIG. 3, the container 20 is a bottle with a circular opening.

The main body 1 of the cap 10 provided by the present invention can control the opening and closing of the opening 210 of the container. As shown in FIG. 3, the inner side of the main body 1 has thread 110. Through a complementary thread structure 2100 at the outer side of the opening 210 of the container, the main body 1 can be screwed opened (in anti-clockwise direction) and screwed closed (not shown)(in clockwise direction) on the opening 210 of the container by rotation.

In the present invention, when the main body 1 of the cap 10 provided is screwed closed on the opening 210 of the container, the closed end 1' of the main body 1 will abut against the opening 210 of the container. Meanwhile, the opened end 1" of the main body 1 will face toward the opening 210 of the container and cover and fit on the opening 210 of the container. Consequently, the opening 210 of the container is in a closed state with the container 20 remaining sealed.

In the present invention, the outer side of the main body 1 of the cap 10 provided can have a knurled portion 120. When the container 20 is to be opened, the knurled portion 120 can facilitate applying a force to rotate and separate the main body 1 and the ring member 2.

In the present invention, depending on the actual needs, the first incision line 3 disposed between the main body 1 and the ring member 2 of the cap 10 provided can have a plurality of connecting pins 31 to connect the main body 1 and the ring member 2. The shape, size, quantity, and spacing of the plurality of connecting pins 31 are not particularly limited. When the size and quantity of the plurality of connecting pins 31 of the first incision line 3 are smaller and the spacing of the plurality of connecting pins 31 is larger, the force needed to break the plurality of connecting pins 31 is smaller. On the contrary, when the size and quantity of the plurality of connecting pins 31 of the first incision line 3 are larger and the spacing of the plurality of connecting pins 31 is smaller, the force needed to break the plurality of connecting pins 31 is larger. In the present example, the size and quantity of the plurality of connecting pins 31 of the first incision line 3 are smaller and the spacing of the plurality of connecting pins 31 is larger. In addition, the plurality of second incision lines 4 do not possess a plurality of connecting pins 31. Therefore, the force needed to break the plurality of connecting pins 31 is smaller. Subsequently, users can separate the main body 1 and the ring member 2 more easily; that is, the cap 10 can be opened from the opening 210 of the container more easily.

In the present invention, when the main body 1 of the cap 10 provided by the present invention has been screwed opened from the opening 210 of the container, the plurality of connecting portions 5 will connect the main body 1 and the ring member 2 together. Since the ring member 2 is fitted below a bulge portion 2200 of the opening 210 of the container; thus, the ring member 2 will not detach from the opening 210 of the container. As a result, the connection between the main body 1 separated from the opening 210 of the container with the ring member 2 will allow the main body 1 to still remain in a connected state with the container 20. Moreover, the plurality of connecting portions 5 can also allow the main body 1 to remain in an opened state. The plurality of connecting portions 5 will prevent the main body 1 from interfering the opening 210 of the container. The plurality of connecting portions 5 will also decrease the free movement of the main body 1. As a result, when emptying the contents from the container 20, the plurality of connecting portions 5 can prevent the main body 1 from touching other objects due to its free movement. For example, when the container 20 is a water bottle, when users are drinking from the water bottle, the plurality of connecting portions 5 will prevent the main body 1 from touching the faces and any body parts of the users. In addition, the plurality of connecting portions 5 can also prevent the residual contents at the inner side of the main body 1 to spill out easily by decreasing the free movement of the main body 1. And since the ring member 2 fitted on the opening 210 of the container can freely rotate; hence, the plurality of connecting portions 5 will not be pulled off easily.

In the present invention, the cap provided can be made by using any materials known in the art, wherein the material for the cap is preferred to be plastic, such as polyester, PET, PE, HDPE, PP, PS, PMMA or PC. In all the above-mentioned examples, the material for the cap is PP. The cap can be manufactured by any processes known in the art. In all the above-mentioned examples, the manufacturing process of the cap is by injection molding. The first incision line and the plurality of second incision lines can be formed by any known methods. In all the above-mentioned examples, the first incision line and the plurality of second incision lines are formed by rotary cutting and the incisions are done by cutting tools or laser cutting.

Overall, the design and structure of the cap for a container provided by the present invention are simple. Simply just by using a first incision line and a plurality of second incision lines, a plurality of connecting portions are created. The plurality of connecting portions created can connect the container with the cap separated from the container to prevent the cap from being lost or discarded. The plurality of connecting portions created can also maintain the cap in an opened state where the cap does not interfere the opening of the container and the free movement of the cap is decreased. The end result is a cap with an enhanced operating convenience. Unlike conventional caps, the cap of the present invention does not require to additionally dispose a barrier structure in order to achieve the same functions of the cap described above.

Although the present invention has been explained in relation to its preferred embodiments, it is to be understood that many other possible modifications and variations can be made without departing from the spirit and scope of the invention as hereinafter claimed.

What is claimed is:

1. A method for providing a cap for a container, comprising:
    forming a main body having a top plate and a circular sidewall, where two opposite sides of the circular sidewall circularly connect to each other and where one periphery of the circular sidewall connects to one surface of the top plate forming a closed end so that the other periphery of the circular sidewall at the opposite side of the closed end forms an opened end;
    forming a ring member located at the opened end of the main body;
    separating the ring member from the main body by a first incision line in between the opened end of the main body and the ring member so that the ring member is connected to the main body by a plurality of connecting portions and so that two ends of the first incision line are separated by the plurality of connecting portions;
    locating a plurality of connecting pins along the first incision line so that the plurality of connecting pins connect the main body and the ring member at the two sides of the first incision line;
    placing a plurality of second incision lines located on the main body or the ring member and located at one side of the plurality of connecting portions so that at least one of the plurality of second incision lines is connected with the first incision line and so that a first of the plurality of second incision lines does not connect with any other incision line, including:
        forming a first connection portion from the plurality of connection portions in between the first of the plurality of second incision lines and the first incision line, and
        forming a second connection portion from the plurality of connecting portions in between the first of the plurality of second incision lines and another of the plurality of second incision lines.

2. The method as claimed in claim 1, including;
separating each of the plurality of connecting portions by parts of the plurality of second incision lines.

3. The method as claimed in claim 1, including:
extending the plurality of second incision lines the main body to the ring member, or from the ring member to the main body.

4. The method as claimed in claim 1, wherein the plurality of second incision lines are straight lines, curved lines, polylines, arc lines, or combinations thereof.

5. The method as claimed in claim 4, wherein corners of the plurality of second incision lines are curved corners, chamfered corners, sharp corners, or combinations thereof.

6. The method as claimed in claim 1, wherein the plurality of second incision lines surround parts of the circular sidewall or the ring member, but do not fully surround the circular sidewall or the ring member.

7. The method as claimed in claim 1, wherein the plurality of second incision lines surround less than ¾ of the circular sidewall or the ring member.

8. The method as claimed in claim 7, wherein the plurality of second incision lines surround less than ½ of the circular sidewall or the ring member.

9. The method as claimed in claim 1, wherein the inner side of the main body has thread.

10. The method as claimed in claim 1, wherein the first incision line is a straight line, curved line, polyline, arc line, or a combination thereof.

11. The method as claimed in claim 1, wherein the container is a round bottle, or a round can.

12. A method for providing a cap for a container, comprising:
    forming a main body having a top plate and a circular sidewall, where two opposite sides of the circular sidewall circularly connect to each other and where one periphery of the circular sidewall connects to one surface of the top plate forming a closed end so that the other periphery of the circular sidewall at the opposite side of the closed end forms an opened end;
    forming a ring member located at the opened end of the main body;
    separating the ring member from the main body by a first incision line in between the opened end of the main body and the ring member so that the ring member is connected to the main body by a plurality of connecting portions and so that two ends of the first incision line are separated by the plurality of connecting portions;

locating a plurality of connecting pins along the first incision line so that the plurality of connecting pins connect the main body and the ring member at the two sides of the first incision line;

placing a plurality of second incision lines located on the main body or the ring member and located at one side of the plurality of connecting portions so that at least one of the plurality of second incision lines is connected with the first incision line and so that a first of the plurality of second incision lines does not connect with any other incision line.

13. The method as claimed in claim 12, wherein the plurality of second incision lines are L-shaped lines, S-shaped lines, Z-shaped lines, or combinations thereof.

14. A method for providing a cap for a container, comprising:

forming a main body having a top plate and a circular sidewall, where two opposite sides of the circular sidewall circularly connect to each other and where one periphery of the circular sidewall connects to one surface of the top plate forming a closed end so that the other periphery of the circular sidewall at the opposite side of the closed end forms an opened end;

forming a ring member located at the opened end of the main body;

separating the ring member from the main body by a first incision line in between the opened end of the main body and the ring member, the first incision having a first end and a second end, the first end being separated from the second end; and, forming a second incision, that includes a first end, a second end and a section;

wherein the first end that extends over the first end of the first incision on a side of the first incision towards the main body;

wherein the center section connects the first end of the second incision to the second end of the second incision, at least part of the center section extending though an area between the first end of the first incision and the second end of the first incision; and, wherein the second incision does not intersect the first incision.

15. A method as in claim 14, wherein the second end of the second incision extends over the second end of the first incision on a side of the first incision towards the ring member.

16. A method as in claim 14, wherein the first incision and the second incision are configured so that when the cap is on a bottle and the cap is unscrewed, the main body separates from the ring member except for two connecting portions formed by the first incision and the second incision.

\* \* \* \* \*